April 3, 1951     P. K. CHATTERJEA ET AL     2,546,973
ARRANGEMENT FOR DETERMINING DISTANCE
BY MEANS OF ELECTROMAGNETIC WAVES Filed Dec. 10, 1942     3 Sheets-Sheet 1

Inventor
P. K. Chatterjea.
L. W. Houghton.
By Loyd Hall Sutton
Attorney

April 3, 1951 P. K. CHATTERJEA ET AL 2,546,973
ARRANGEMENT FOR DETERMINING DISTANCE
BY MEANS OF ELECTROMAGNETIC WAVES
Filed Dec. 10, 1942 3 Sheets-Sheet 3
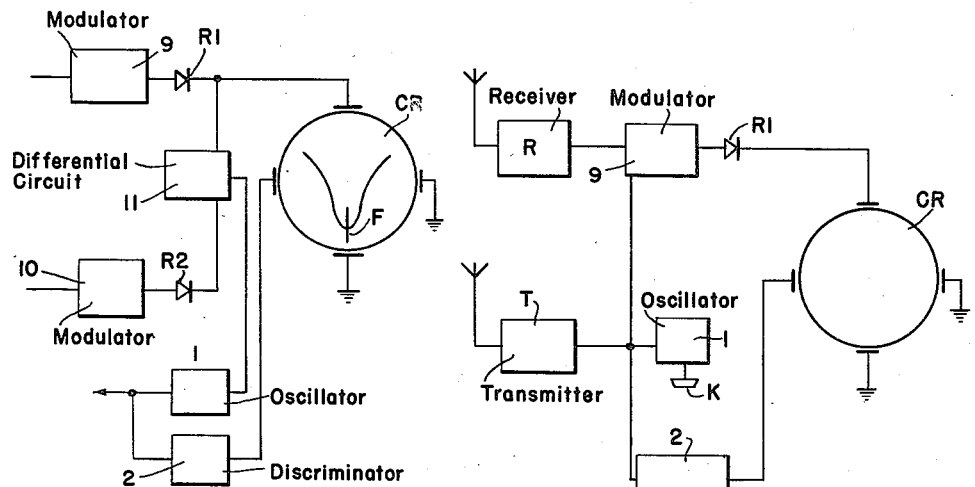
FIG.8.
FIG.9.
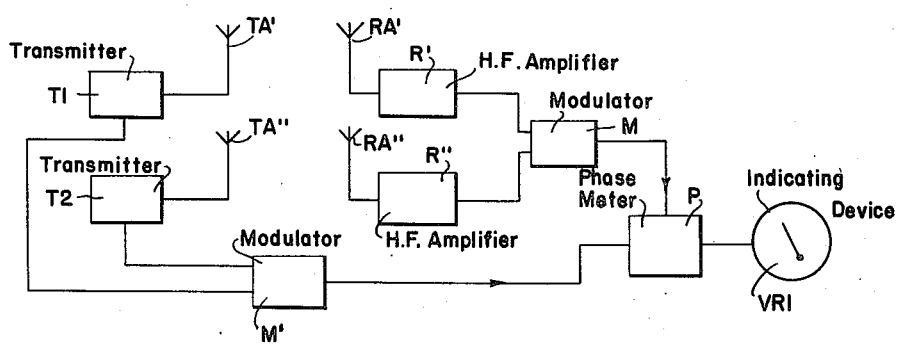
FIG.10.
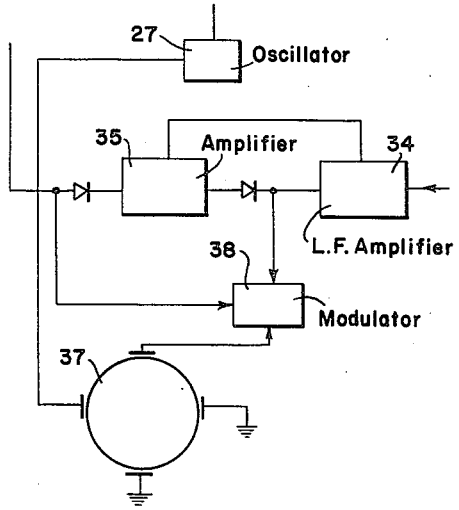
FIG.11.
INVENTORS
P.K.Chatterjea
L.W. Houghton
BY R.P.Morris
ATTORNEY Patented Apr. 3, 1951

2,546,973

UNITED STATES PATENT OFFICE 2,546,973

ARRANGEMENT FOR DETERMINING DISTANCE BY MEANS OF ELECTROMAGNETIC WAVES

Prafulla Kumar Chatterjea and Leslie Wilfred Houghton, London W. C. 2, England, assignors, by mesne assignments, to International Standard Electric Corporation, New York, N. Y., a corporation of Delaware Application December 10, 1942, Serial No. 468,571
In Great Britain October 15, 1941

Section 1, Public Law 690, August 8, 1946
Patent expires October 15, 1961

16 Claims. (Cl. 343—10)

The present invention relates to arrangements for determining the distance of an object from a transmitter by utilising the reflection of electromagnetic waves and comprising means for measuring the phase difference between the wave leaving the transmitter and the contemporaneous wave received at the transmitter after reflection from the object.

In the near past, arrangements for locating objects have, for the reason of economy of power among other special reasons, used pulses (preferably short sharp pulses) of repetition frequency which may in general be supersonic, to modulate a carrier wave to obtain information regarding moving or stationary obstacles at a distance, for example, an aircraft in flight.

The present invention has for its end to provide improved arrangements for obtaining the distance of an object by utilising the reflection of electromagnetic waves and the measurement of a phase change occurring between the wave leaving the transmitter and its reception at the receiver after reflection at the object.

The change in phase produced by the wave in travelling from the transmitter to the object and back to the receiver is a measure of the distance travelled, and when the transmitter and receiver are in close proximity to each other, the phase change represents twice the distance of the object from the transmitter, for most practical purposes.

According to one feature of the invention, arrangements for determining the distance of an object from a transmitter by utilising the reflection of electromagnetic waves and comprising means for adjusting the frequency of the transmitted wave until a specific phase change occurs between the wave received at a receiver directly from the transmitter and the wave received at said receiver after reflection from the object is characterised by further comprising means for vectorially adding at said receiver the energies of the waves directly received from the transmitter and the contemporaneously received wave after reflection from said object, and means for automatically adjusting the frequency adjusting means under the control of the vectorial sum of the said energies.

In carrying out this feature of the invention the frequency of the wave is adjusted so that the vectorial sum referred to is a minimum in which case the phase change between the direct and reflected waves at the receiver is 180°. The frequency then is a measure of the distance of the object from the transmitter.

According to another feature of the invention arrangements for determining the distance of an object from a transmitter by utilising the reflection of electromagnetic waves and measuring the phase change which occurs at a receiver between the wave directly received from the transmitter and the wave received after reflection from the said object comprises means for producing and transmitting two frequencies $f_1$ and $f_2$ and means for comparing the phases of the beat frequencies between $f_1$ and $f_2$ as received at a receiver directly from the transmitter and after reflection from said object.

The following description in conjunction with the accompanying drawings will render the invention clear.

In the drawings, Figure 1 is a diagram illustrating the relative positions of the transmitter and receiver of the invention with respect to an object the distance of which from the transmitter is to be measured;

Fig. 8 is a circuit diagram of a portion of the arrangement of Fig. 4, showing a modified form;

Fig. 9 is a circuit diagram of a portion of Fig. 4 showing another modified form;

Fig. 10 is a block diagram of still another form of the invention;

Fig. 11 is a circuit diagram of a portion of the arrangement of Fig. 7 showing a modified form of the indicating device.

Figure 1:
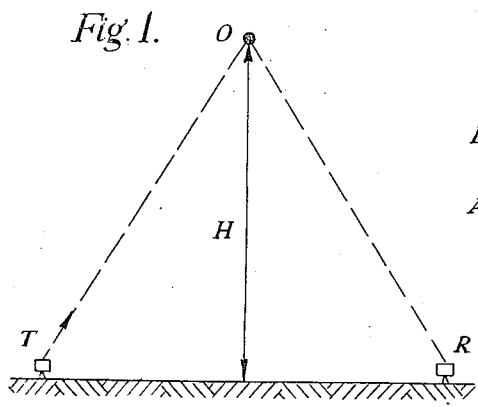

In the arrangements according to the invention continuous transmission and reception take place and consequently separation of the transmitter and receiver are necessary but they may be kept in close proximity by using directive antenna arrays. Fig. 1 shows in a general way the relative positions of the transmitter T and receiver R and the object O to be located, it being understood that the distance between the transmitter and receiver may be very small with respect to the distance H. The distance H which is usually the distance required to be known can readily be determined on obtaining the time required for a radio signal to travel from the transmitter to the receiver via the object— say $t$ secs.

Figure 2:
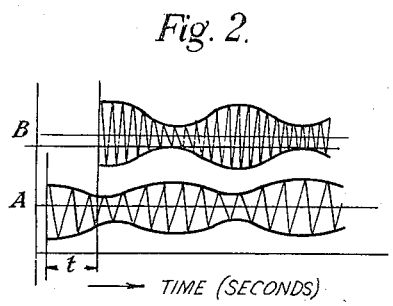
Fig. 2 is a diagram of the waves received directly from the transmitter and those received by reflection from the object.

According to one embodiment of this invention the carrier wave is modulated with a frequency F such that $$\frac{1}{2F}$$

the time of one half cycle, is equal to $t$. The relative amplitudes of the transmitted signal at the transmitter and receiver will then be as shown in Fig. 2, where A shows the signal at the transmitter, and B the signal at the receiver displaced in time by $t$ secs. If rectified, the low frequency current obtained will be just 180° out of phase with the signal used for modulating the carrier at the transmitter. These conditions can be readily observed, and give a rigid relationship between H and F, the measurement of the latter affording a means of direct calibration for H.

A method of determining the correct frequency is to add the modulating signals in the transmitter and demodulated signals in the receiver together, and note the frequency giving a minimum resultant signal, that being when they are 180° out of phase.

Figure 3:
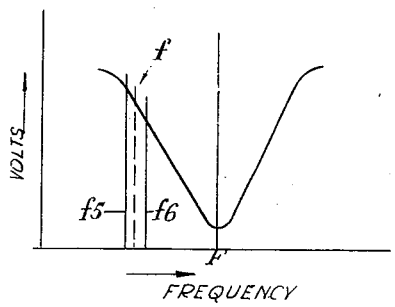
Fig. 3 is a diagram showing the sum with respect to frequency of the directly received waves and the waves received by reflection.

Figure 3 shows the variation of resultant voltage with frequency on adding the phased transmitted and reflected received A. C. voltages together, F representing the completely out-of-phase point. It will be observed that when $f_5$ and $f_6$ are located one on either side of F, i. e. when $f = F$, the resultant voltages are equal.

Figure 4:
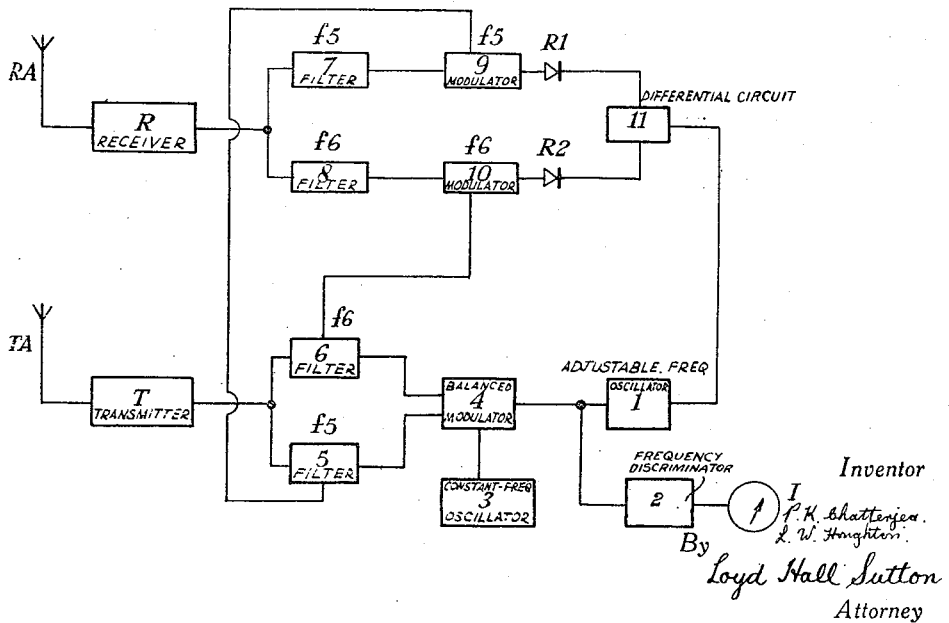
Fig. 4 is a block diagram of the circuits of one embodiment of the invention.
Figure 5:
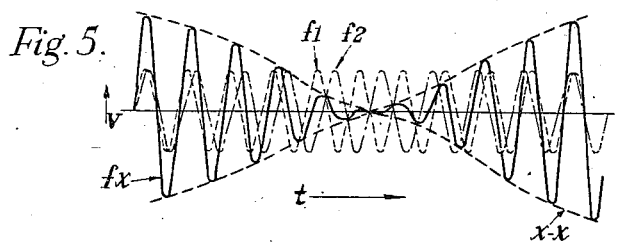
Fig. 5 is a diagram illustrating the beat note effect between two frequencies transmitted in accordance with the invention.
Figure 6:
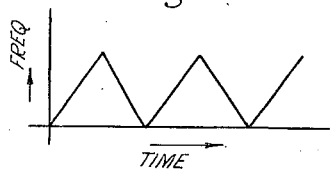
Fig. 6 is a diagram illustrating one manner of varying one frequency of the system utilizing two frequencies.
Figure 7:
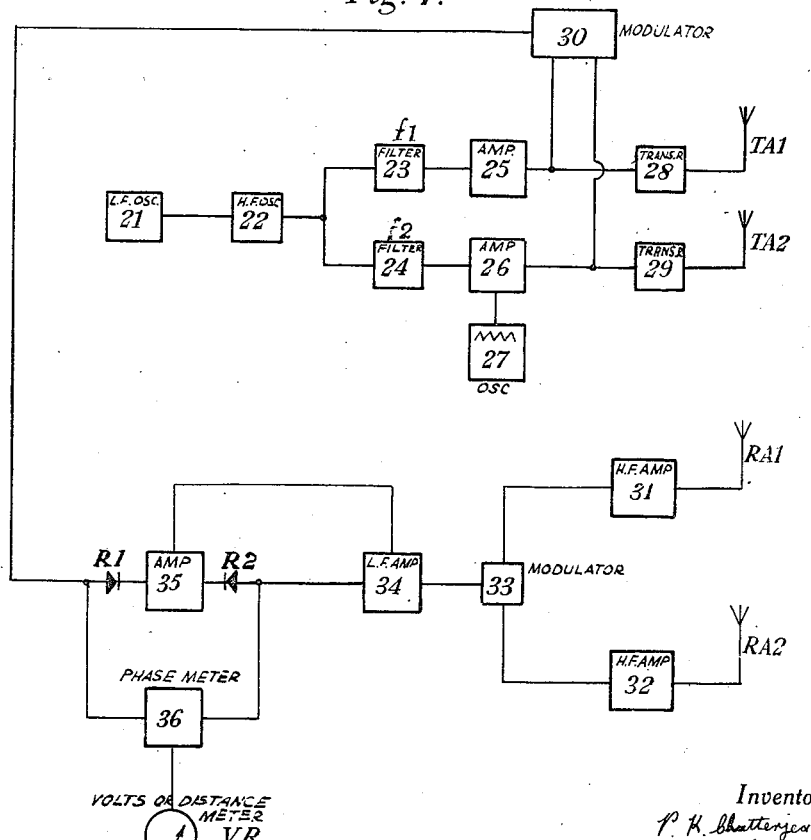
Fig. 7 is a block diagram of the circuits of another embodiment of the invention.

Figure 4 shows schematically, arrangements for obtaining these conditions of complete antiphase automatically and indicating the frequency at which the said conditions are obtained.

Referring to Fig. 4, 1 is an adjustable frequency oscillator whose frequency F can be indicated as a voltage by frequency discriminator circuit 2 and indicator I. Any arbitrary frequency from oscillator 1, say $f$, is modulated preferably in a balanced modulator 4 by a frequency from oscillator 3, resulting in two side bands which are separated by filters 5 and 6, producing the outputs $f_5$, $f_6$, respectively, both of which are applied to modulate the transmitter T, the output from which is radiated towards the object O from antenna TA. The output from antenna TA will thus consist of a high frequency carrier wave amplitude modulated by frequencies $f_5$ and $f_6$.

The waves after reflection from the object are received by collector antenna RA and fed to the receiver R. At the receiver R these two tones $f_5$, $f_6$ received after reflection are separated by filters 7 and 8 and then at modulator units or frequency mixer units 9 and 10, respectively, the energies are added to energies of their corresponding frequencies from the outputs of filters 5 and 6. If frequency $f$, is at some frequency other than at frequency F, as shown in Fig. 3, the outputs from modulators 9 and 10 will be unequal. The two output voltages from modulators 9 and 10 are rectified in rectifiers R1 and R2, respectively, and applied to differential circuit 11 to obtain a differential output which is applied to vary the frequency of oscillator 1 until the output frequency is equal to frequency F, in which case, it will be noted from Figure 3, the output from modulators 9 and 10 will be equal, and a stable condition will exist—with the indicator I of the frequency discriminator circuit 2 giving an indication of frequency F.

The differential unit 11 may be a mechanical arrangement according to standard practice, or it may be electrical, use being made of the differential output voltage taking account of sign to control the frequency of oscillator 1 in known manner as by means of the Miller effect. The actual voltage difference at the output of differential circuit 11 is controlled by the instantaneous voltages of modulators 9 and 10, and these latter increase with increased difference between frequencies $f$, and F.

An alternative arrangement for obtaining an indication of the frequency F is shown in Fig. 8 and comprises a cathode ray oscillograph CR. To one pair of deflecting elements, for example, the vertical pair, the output of R1 or R2 is fed and the output of the discriminator 2 is fed to the horizontal pair. The horizontal scale of the oscillograph then corresponds to the range of frequency modulation and the vertical scale to the sum of the signal voltages transmitted and received. The resulting curve or trace obtained on the oscillograph screen by varying the frequency of oscillation cyclically is of the shape shown in Figure 3, the point F on the horizontal scale being an indication of the distance of the object from the equipment location.

A single one of the modulation frequencies $f_5$ and $f_6$ also only need be used if the frequency of the oscillator 1 can be varied manually until a maximum peak or minimum dip (Fig. 3) on the cathode ray oscillograph is obtained. Such an arrangement is shown in Fig. 9 where the oscillator 1 may be at the frequency $f_5$, so that the filters 5 and 6 and the modulator 4 and constant frequency oscillator 3 of Fig. 4 may be omitted. The filters 7 and 8 and the modulator 10, as well as the differential circuit 11 of Fig. 4, may then also be omitted, as shown. The oscillator 1 is then varied manually by means of the knob K.

The range of modulating frequencies involved would be as follows, neglecting separation distance of transmitter and receiver, If $H = 1$ mile; time interval between transmitter and $$\text{receiver} = \frac{2}{186,000} \text{ sec.}$$

$$F = \frac{1}{2t} = \frac{186000}{4} = 46,500 \text{ C. P. S.}$$

If $H = 6$ miles, $F = \frac{186000}{24} = 7,750$ C. P. S.

Except under conditions when the distance from the object is small compared with the distance between transmitter and receiver, direct pick up by receiver from the transmitter can be neglected as this will only aid the transmission by direct connection between transmitter and receiver. If greater accuracy is required correction for phasing should be undertaken.

There seems to be a number of advantages in the use of a system similar to this, as compared with systems using the reflection of pulses.

If used from aeroplane to aeroplane, the frequency range involved is small so that there is less possibility of a located plane picking up the transmission, especially on a spare harmonic. The same apparatus can easily be used for normal communication and in fact could probably be morse modulated at the same time, an aspect which should be useful in blind-landing of an object from a transmitter by utilising the reflection of electromagnetic waves and measuring the phase difference which occurs at a receiver between the wave directly received from the transmitter and the wave received after reflection from said object, comprising means for transmitting waves at two frequencies, means for cyclically varying one frequency of the transmitted wave, a receiver positioned at a known distance from said transmitter, a cathode ray oscillograph, means for applying a component of the varied frequency of the transmitted wave to one deflecting unit of said oscillograph, means for vectorially adding at said receiver the amplitudes of the waves received directly from the transmitter and after reflection from said object, and means for applying the vectorial sum of said amplitudes to the other deflecting unit of said cathode ray oscillograph, whereby a trace is produced on said oscillograph indicating a minimum vectorial sum at a particular frequency which is a measure of the distance of the object.

2. Apparatus for determining the distance of an object from a reference point comprising a transmitter and a receiver located at a known distance from said transmitter, said transmitter having an adjustable frequency oscillator and means for transmitting electromagnetic waves derived from said oscillator, said receiver being adapted to receive energy from the transmitted electromagnetic waves which are reflected from said object and also directly from said transmitter and containing a circuit for vectorially adding said energies, a circuit connecting said last-mentioned circuit and said adjustable frequency oscillator for adjusting the frequency of said oscillator in accordance with said vectorial sum so that a predetermined phase displacement exists at the receiver between the two wave energies, and means to utilize the amount of said adjustment as a measure of said distance.

3. Apparatus according to claim 2 wherein the circuit for adjusting the frequency of said oscillator includes means for producing a frequency adjustment of the oscillator which makes the vectorial sum a minimum.

4. Apparatus for determining the distance of an object from a reference point comprising a transmitter and a receiver, means at said transmitter to produce two frequencies, at least one of which is adjustable, means for transmitting from said transmitter an electromagnetic carrier wave modulated by said two frequencies, said receiver being adapted to receive the transmitted electromagnetic waves after reflection from said object and also waves directly from said transmitter, said receiver comprising filters for separating the modulations of the received reflected waves, modulator circuits connected to the output of said filters and to said frequency-producing means, a differential circuit connected to said modulator circuits and adapted to add vectorially energies derived from the received reflected waves and from the waves received directly from said transmitter, and a circuit responsive to the output of the differential device for adjusting the adjustable frequency at said transmitter to decrease the output from said differential device to a minimum.

5. Apparatus according to claim 4 wherein the two frequencies are produced by a low frequency oscillator and a variable frequency oscillator whose outputs beat together to provide sum and difference frequencies.

6. Apparatus for determining the distance of an object from a reference point comprising a transmitter and a receiver located at a known distance from said transmitter, said transmitter having a low frequency oscillator and a variable frequency oscillator whose outputs beat together to provide sum and difference frequencies, means for transmitting from said transmitter an electromagnetic carrier wave modulated by the frequency from both said oscillators, said receiver being adapted to receive the transmitted electromagnetic waves after reflection from said object and also waves directly from said transmitter, said receiver comprising filters for separating the modulations of the received reflected waves, a cathode ray oscillograph having two deflecting units, means to apply to one of said units a voltage depending on the amplitudes of the said sum and difference frequencies, and means to apply to said other unit the vectorial sum of the transmitted and received energies corresponding to one of said sum or difference frequencies.

7. The method of determining the distance of an object from a given reference position which comprises generating two frequencies, translating said frequencies into electromagnetic waves, radiating said waves in the direction of said object, receiving said waves by reflection from said object, producing a first beat frequency between the two generated frequencies at said position, producing a second beat frequency between the two frequencies received by reflection from said object, comparing the phases of said first and second beat frequencies, and utilizing the phase displacement therebetween as a measure of the distance of said object from said position.

8. The method according to claim 7 which comprises the step of maintaining a constant relationship between the amplitudes of the first and second beat frequencies.

9. The method according to claim 7 wherein at least one of the two frequencies is varied so as to produce variable beat frequencies, and including the step of producing an indication of the frequency which is varied when a predetermined phase difference exists between said first and second beat frequencies.

10. Apparatus for determining the distance of an object from a reference point comprising a transmitter and a receiver, said transmitter comprising a high frequency oscillator, a low frequency oscillator and means for modulating the output of the high frequency oscillator by said low frequency oscillator, filters for separating the sum and difference frequency products of modulation, another oscillator whose frequency is cyclically and continuously varied, and means to beat the output of the last mentioned oscillator with one of said sum and difference frequencies, said transmitter comprising means to radiate said sum and difference frequencies towards said object as modulated electromagnetic waves, said receiver being adapted to receive said waves after reflection from said object, means fed from said filters in said transmitter to beat said sum and difference frequencies together after the beat is produced between one of them and the output of said last mentioned oscillator, and including means to beat the received sum and difference frequencies together, means for measuring the phase difference between the beat produced by said receiver beating means and the last mentioned beating means associated with said transmitter, and means for utilizing said phase difference as a measure of said distance.

11. Apparatus according to claim 10 in which the beat frequencies used to determine the phase difference measurement are also both rectified and the rectified components are applied differentially as a gain controlling voltage to a low frequency amplifier forming part of the receiver, so as to maintain a definite relation between the vectorially added beat frequency amplitudes.

12. Apparatus for determining the distance of an object from a reference position comprising a transmitter adapted to transmit in the direction of said object, a receiver located at a known distance from said transmitter and adapted to receive energy by reflection from said object, an oscillator connected so as to modulate the carrier wave of said transmitter, means to adjust the frequency of said oscillator, means to produce a beat between the output of said receiver and the output of said oscillator, means to indicate the amplitude of said beat, and means to determine the distance of said object from said position by the adjustment of said oscillator necessary to reduce the amplitude of said beat to a minimum.

13. Apparatus in accordance with claim 12, in which a cathode ray tube is used both as the indicating means and as the distance determining means.

14. Apparatus for determining the distance of an object from a reference position comprising transmitting apparatus, means to cause said object to transmit two different frequencies in the direction of an object to be located, a receiving apparatus located at a known distance from said transmitting apparatus, and adapted to receive the two frequencies after reflection from said object, means included in said transmitting apparatus adapted to produce a beat between the two frequencies transmitted thereby, means included in said receiving apparatus to produce a beat between the frequencies received thereby, means to compare the phase of the two beats, and means to determine the distance of said object from the phase displacement of said beats.

15. Apparatus according to claim 14 in which the phase comparing means is a phase meter producing a voltage the magnitude of which is determined by the phase displacement and the distance determining means is a meter operated by said voltage and calibrated in distance units.

16. Apparatus for determining the distance of an object from a reference position comprising a transmitter located at said position, means to cause said transmitter to transmit two frequencies in the direction of said object, a receiver located at a known distance from said transmitter and adapted to receive said two frequencies reflected from said object, means included in said receiver to separate said frequencies, two separate means to beat each of said received frequencies, respectively, with the corresponding frequency as produced at said transmitter, differential means to compare the amplitudes of the beat frequencies produced by said beating means, means controlled by said differential means to adjust at least one of the frequencies transmitted by said transmitter so as to maintain the amplitude of the beat frequencies at a minimum, and means to utilize the frequency adjustment as a measure of said distance.

PRAFULLA KUMAR CHATTERJEA.
LESLIE WILFRED HOUGHTON.

REFERENCES CITED

The following references are of record in the file of this patent:

UNITED STATES PATENTS

| Number | Name | Date |
|---|---|---|
| 1,993,326 | Hart | Mar. 5, 1935 |
| 2,147,810 | Alford | Feb. 21, 1939 |
| 2,183,399 | Heising | Dec. 12, 1939 |
| 2,206,896 | Higgins et al. | July 9, 1940 |
| 2,236,893 | Chaffee | Apr. 1, 1941 |
| 2,268,643 | Crosby | Jan. 6, 1942 |
| 2,366,621 | Hineline | Jan. 2, 1945 |

FOREIGN PATENTS

| Number | Country | Date |
|---|---|---|
| 472,891 | Great Britain | Sept. 29, 1937 |